United States Patent [19]

Hasquenoph et al.

[11] 4,060,213
[45] Nov. 29, 1977

[54] PRESSURE CONTROL DEVICE

[75] Inventors: Jean H. Hasquenoph, Lagny-sur-Marne; Pierre Fernand Coutin, Paris, both of France

[73] Assignee: R. Alkan & Cie, Valenton, France

[21] Appl. No.: 701,707

[22] Filed: July 1, 1976

[30] Foreign Application Priority Data

July 2, 1975 France .................. 75.20712

[51] Int. Cl.[2] .............................................. B64D 1/02
[52] U.S. Cl. .............................. 244/137 R; 89/1.5 C; 137/505.23; 294/83 AE
[58] Field of Search ............... 244/137 R; 294/83 R, 294/83 AE; 89/15 R, 15 C, 15 F, 15 G; 137/505.22, 505.23, 505.29

[56] References Cited

U.S. PATENT DOCUMENTS 2,720,887 10/1955 Safford .................. 137/505.29 X
2,822,207 2/1958 Steinmetz et al. ........ 244/137 R X
3,883,097 5/1975 Billot .................... 89/1.5 F X Primary Examiner—Trygve M. Blix
Assistant Examiner—Barry L. Kelmachter
Attorney, Agent, or Firm—William Anthony Drucker

[57] ABSTRACT

This pressure control device, more particularly for use in pyrotechnical load ejectors of the type used for jettisoning loads on aircrafts, comprises an easily detachable block consisting of a main body and of detachable component elements secured to the main body, the latter comprising a bore for the sliding mounting of a spool valve urged by a return spring for automatically limiting the downstream pressure delivered to the pyrotechnical impellers mounted in cavities of the main body, other component elements secured laterally to the body permitting when removed an easy access to the gas passages for cleaning purposes.

4 Claims, 1 Drawing Figure

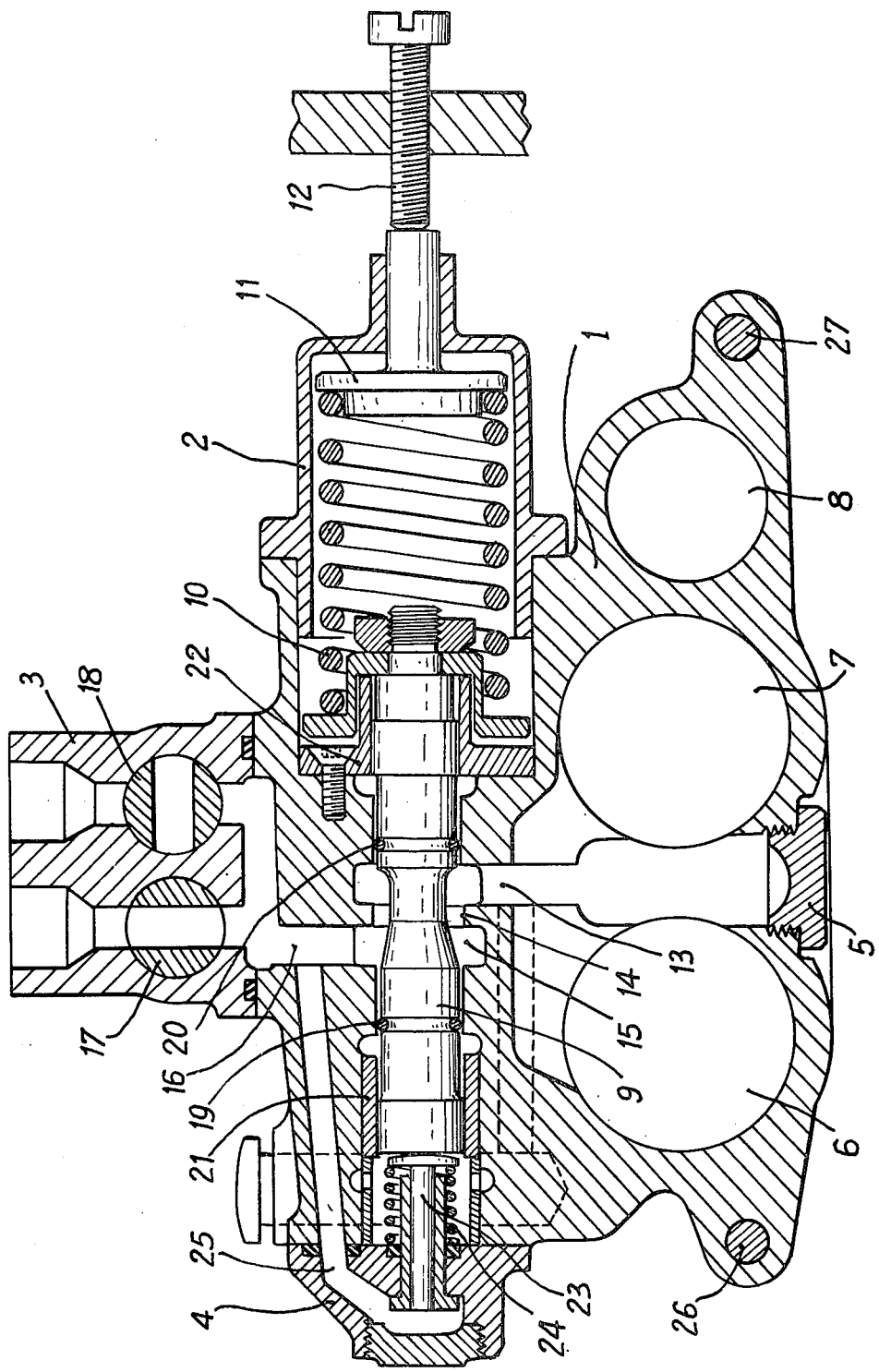

PRESSURE CONTROL DEVICE

BACKGROUND OF THE INVENTION

1. Field of the Invention

This invention relates in general to pressure control devices and has specific reference to a device of this kind intended for use in a pyrotechnical load ejector of the type used for jettisoning loads on aircrafts.

2. Description of the Prior Art

As a rule, jettisoning loads carried by the lower structure of aircrafts is attended by a powerful thrust for causing the loads to move as fast as possible away from the aircraft. The energy required for this purpose is supplied in most instances by a pyrotechnical device acting on pistons-type ejectors. However, the very sudden pressure increment produced when firing this device is detrimentalin that both the load to be jettisoned and the aircraft structure in that both the load to be jettisoned and the aircraft structure are exposed to an abnormally high though momentary stress, considering the total energy implemented.

SUMMARY OF THE INVENTION

It is the essential object of the present invention to provide an adjustable device capable of permitting the proper use of the energy generated by the pyrotechnical means while limiting the pressure thus developed to preselected and substantially constant value throughout the ejected time. The device according to this invention is based on the well known regulation principal consisting in submitting a value or spool member on the one hand to the pressure necessary for partially closing the fluid passage so that the resultant loss pressure will limit the downstream pressure, and on the other hand to the force of a calibrated spring acting in the direction to open said passage when the pressure tends to drop below predetermined threshold.

The above principle is adapted according to this invention to the specific conditions of operation required for ejecting load from an aircraft, which implies:

the use of two regular pyrotechnical impellers so that firing a first impeller causes by propagation the firing of the other impeller;

the necessity of causing the thrust applied to one ejection piston to have a variable value in relation to that other piston;

the protection of the componenet elements against soiling caused by the powder combustion, and the construction in a relatively small volume of an interchangeable device adapted to be easily removed and replaced.

For this purpose, the present invention provides a single compact unit comprising in combination the component elements capable of meeting the above-listed requirements.

BRIEF DESCRIPTION OF THE DRAWINGS:

The single FIGURE illustrates in vertical axial section the pressure control device adapted to receive the pyrotechnical impellers connected to the cylinders of the ejection pistons (not shown).

DESCRIPTION OF THE PREFERRED EMBODIMENT

The unit illustrated comprises a main body 1 having associated therewith detachable members permitting the machining of said body and the assembling of the internal component elements thereof, which comprise a cylinder 2, having its axis aligned with that of a spool valve 9, said cylinder 2 being adapted for this purpose to enclose a coil compression spring 10 associated with the regulating spool valve 9, a body 3 constituting the shells of the cocks controlling the supply of pyrotechnical gas to the ejection pistons, a cap 4 fitted to the end of body 1 opposite said cylinder 2 and through which the pressure is directed against said spool valve 9, and a screw 5 fitted to the bottom of the main body 1 opposite the cock body 3 facilitating the access to the gas inlet passage leading to the spool valve 9.

Conduits 28 lead to respective ejection cylinders 29 containing an injection piston 30, as shown in chain dotted lines the drawing.

A pair of cavities 6 and 7 are formed in said body 1 for mounting the main impellers (not shown), a third cavity 8 being provided for receiving an emergency impeller, also not shown.

The regulating spool valve 9 has one end responsive to the pressure of the return spring 10 housed in cylinder 2 and reacting at its end opposite said spool valve 9 against a piston 11 of which the axial position is adjustable through any suitable means, shown diagrammatically in the drawing in the form of a thrust screw 12 engaging a tapped hole formed in a fixed member.

The gases released or generated when firing the impellers penetrate into an annular groove 13 surrounding the shaped section of reduced diameter of the regulating spool valve 9 providing through an annular seat 14 and along its axis a passage of variable cross-sectional area leading to an annular chamber 15 the outlet port 16 of which is connected to the inlet side of a pair of cocks 17, 18 so that by opening these cocks more or less it is possible to adjust at will the efficiency of the ejection piston (not shown) actuated by said gases under the control of each cock 17, 18. The portion of spool 9 which extends within the annular groove 13, seat 14 and chamber 15 is substantially frusto-conical with its minor base located on the side of spring 10 so that any movement of spool 9 against the force of spring 10 (i.e., to the right as seen in the Figure) will throttle the passage between the gas inlet groove 13 and the downstream annular chamber 15. The spool valve 9 carries in suitable grooves, at the ends of its frusto-conical regulating section, a pair of O-rings 19, 20 beyond which the spool valve 9 can slide in bearing-forming anti-friction bushings 21, 22.

The spool valve 9 is urged against the force of its return spring 10 by a piston 23 engaging the spool and opposite said spring 10 without requiring any accurate alignment with the spool valve, and an auxiliary spring 24 is provided for constantly urging the piston 23 against the spool 9, as shown. The rod of piston 23 is guided within the cap 4 and responsive to the gas pressure downstream of said spool via a passage 25 formed in said cap 4 and in the main body 1, said passage 25 communicating with the outlet port of the spool valve.

The detachable block 1 may be secured through any suitable quick-fastening means to aircraft structure, for example by using studs or bolts as illustrated diagrammatically at 26 and 27.

The above-described device operates as follows:

The relative opening valves or cocks 17, 18 is adjusted beforehand, as a function of the load behaviour during the ejection, as observed during previous tests. The initial stress of spring 10 is also adjusted by means of screw 12 or any suitable system, for example an eccentric system, with due consideration for the maximum permissible efforts for both the load and the aircraft structure. To any initial stress or tension of spring 10 there corresponds, all other factors being equal, a maximum downstream pressure, as will be explained presently.

The impellers are introduced into the corresponding cavities 6, 7 and 8, and fired according to the known and conventional methods, not illustrated, the relative communication between these impellers being designed with a view to produce their mutual firing by propagation according to the known methods.

When firing the impellers the gas thus generated flows through the inlet port 13, chamber 15, outlet port 16 and passage 25, thus exerting a strong pressure against the piston 23 which forces the spool valve 9 to the right (as seen in the Figure) against the force of spring 10. If the force resulting from the pressure thus exerted firstly against piston 23 exceeds the initial force of spring 10, the spool 9 will move to the right, thus throttling the gas passage as the major base of the frusto-conical section of spool 9 approaches the seal 14. The loss of pressure thus produced counteracts and maintains the downstream pressure. When the pressure drops as a consequence of the exhaustion of the initial energy, the pressure exerted on piston 23 decreases likewise and spring 10 forces again to the left the spool 9, whereby the cross-sectional passage area between upstream and downstream increases, and the downstream pressure is maintained, at least as long as there is an upstream power available under a sufficient pressure.

It is clear that there is a constant state of equilibrium between the downstream pressure exerted on piston 23 and the force of spring 10, thus providing the necessary regulation, and on the other hand it is possible to select or control the maximum downstream pressure by adjusting the initial tension or prestress of spring 10.

The spool valve 9 on which considerable efforts are exerted has its end slidably mounted in suitable bushings 21, 22 made of anti-friction or self-lubricating materials, said bushings being protected against soiling by the combustion products by the presence of the O-rings 19 and 20. To avoid the presence of aligned bearings or bushings, the pressure is exerted on spool member 9 through the medium of an independent piston 23 constantly kept in contact with said spool 9 by the compression spring 24, in order to prevent any hammering or shock between these two members. Reference has already been made in the foregoing to a block or casting comprising several component elements in order to facilitate the machining thereof and permit the assembling of the mechanism.

Finally, it is on purpose that the mounting of this device is relatively simple, in order to facilitate the quick replacement of worn or faulty parts with new ones, and also with due regard for the relatively frequent cleaning operations made necessary by the detrimental presence of power combustion residues.

Although a single form of embodiment has been described hereinabove and illustrated in the appended drawing, it will readily occur to those conversant with the art that various modifications and changes may be brought thereto without departing from the basic principle of the invention as set forth in the appended claims.

What we claim is:
1. A pressure control device comprising:
   i. a valve body including:
      a. a valve chamber including a first chamber portion, a second chamber portion spaced axially from said first chamber portion, and an annular valve seating between said first and second chamber portions
      b. cavities for receiving sources of gas under pressure
      c. inlet passage means leading from said cavities to said first chamber portion
      d. outlet passage means leading from said second chamber portion to outlet ports
      e. a control gas passage communicating with said outlet passage means
   ii. a spool valve assembly axially movable in said valve chamber and having a frusto-conical portion adapted to coact with said annular valve seating
   iii. a first element detachably mounted on said valve body and including a cylinder aligned with said valve chamber
   iv. spring means disposed in said first element cylinder and abutting one end of said spool valve assembly to urge said spool valve assembly in the axial direction to increase the opening between the frusto-conical portion and the annular valve seating
   v. a second element detachably mounted on said valve body and including valve passage means communicating with the outlet passage means, and adjustable cock means for controlling gas flow through said valve passage means
   vi. A third element detachably mounted on said valve body and defining a transfer passage providing communication between said control gas passage and said spool valve assembly such that gas pressure in said control gas passage acts to urge the spool valve assembly axially against the action of said spring means.

2. A pressure control valve, as claimed in claim 1, wherein said first element further comprises a stop axially slidable in said cylinder and abutted by said spring means, and a thrust member abutting said stop for adjustment of the tension of said spring means.

3. A pressure control valve, as claimed in claim 1, further comprising two axially spaced anti-friction bushings in said valve body, said spool valve being slidable in said bushings, and two O-rings seals axially spaced on said spool valve, one said O-ring seal being positioned axially between said first chamber portion and one of said bushings, and the other of said O-ring seals being positioned axially between the second chamber portion and the other of said bushings.

4. A pressure control valve, as claimed in claim 1, wherein said third element includes an axial piston guide, and wherein said spool valve assembly includes a piston axially abutting a spool valve element, said piston being slidable in said piston guide and having a surface exposed in said transfer passage, and wherein spring means are provided acting between said third element and said piston to urge said piston into abutment with said spool valve element.

* * * * *